(12) United States Patent
Levinson et al.

(10) Patent No.: US 12,481,066 B1
(45) Date of Patent: Nov. 25, 2025

(54) LIDAR SENSOR WITH EMBEDDED PHOTODETECTOR

(71) Applicant: Zoox, Inc., Foster City, CA (US)

(72) Inventors: Jesse Sol Levinson, Redwood City, CA (US); Ryan McMichael, San Francisco, CA (US); Robert Nicholas Moor, San Mateo, CA (US); Mohammad Umar Piracha, Union City, CA (US)

(73) Assignee: Zoox, Inc., Foster City, CA (US)

( * ) Notice: Subject to any disclaimer, the term of this patent is extended or adjusted under 35 U.S.C. 154(b) by 1006 days.

(21) Appl. No.: 17/537,892

(22) Filed: Nov. 30, 2021

(51) Int. Cl.
*G01S 17/931* (2020.01)
*G01B 11/22* (2006.01)
*G01S 7/481* (2006.01)
*G01S 17/89* (2020.01)

(52) U.S. Cl.
CPC ............ *G01S 17/931* (2020.01); *G01B 11/22* (2013.01); *G01S 7/4816* (2013.01); *G01S 17/89* (2013.01)

(58) Field of Classification Search
CPC ...... G01S 17/931; G01S 7/4816; G01S 17/89; G01B 11/22
See application file for complete search history.

(56) References Cited

U.S. PATENT DOCUMENTS

| | | | |
|---|---|---|---|
| 9,612,123 B1 | 4/2017 | Levinson et al. | |
| 10,353,390 B2 | 7/2019 | Linscott et al. | |
| 10,984,543 B1 | 4/2021 | Srinivasan | |
| 12,084,060 B2 | 9/2024 | Dowdall et al. | |
| 2014/0104593 A1* | 4/2014 | Satyan | G01S 7/4911 356/5.09 |
| 2019/0018109 A1* | 1/2019 | Gao | G01S 7/4811 |
| 2020/0057151 A1* | 2/2020 | Finkelstein | G01S 7/4913 |
| 2020/0284883 A1* | 9/2020 | Ferreira | G01S 7/4815 |
| 2022/0050201 A1* | 2/2022 | Sun | H10F 39/803 |
| 2023/0176217 A1* | 6/2023 | Lu | G01S 17/931 356/4.01 |
| 2023/0176219 A1* | 6/2023 | Lu | G01S 17/931 356/4.01 |

OTHER PUBLICATIONS

Li et al. (doc. "Spectral imaging and spectral LIDAR systems: moving toward compact nano-photonics-based sensing") (Year: 2021).*
Paulton et al. "Frequency-modulated Continuous-wave LIDAR Module in Silicon Photonics" (Year: 2015).*

* cited by examiner

*Primary Examiner* — Assres H Woldemaryam
(74) *Attorney, Agent, or Firm* — Lee & Hayes, P.C.

(57) ABSTRACT

A light sensor and apparatus capable of determining depth and image data simultaneously from a target in an environment is discussed herein. The apparatus includes an array of photodetector elements comprising a first portion to detect frequency modulated continuous wave (FMCW) signals from the reflected light signals and one or more additional portions that detect visible light signals from the environment.

14 Claims, 8 Drawing Sheets

LIDAR SENSOR WITH EMBEDDED PHOTODETECTOR

BACKGROUND

Light Detection and Ranging (lidar) sensors can be used to determine three-dimensional data of a target scene (environment) by illuminating the scene with a lidar signal and measuring the reflected light signal. Frequency Modulated Continuous Wave (FMCW) is an example of a coherent detection method that can be used for lidar applications. The FMCW technique is capable of determining both distance and velocity of an object in the environment with a single measurement. Another type of object detection method is luminosity-based sensors. This type of sensor is responsive to wavelengths in the spectral band, such as red, green and blue (RGB) wavelengths. Typically, both lidar sensors and luminosity-based sensors are fabricated on separate integrated circuit (IC) substrates. As such, the data captured from each substrate must be synchronized in time and origin.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
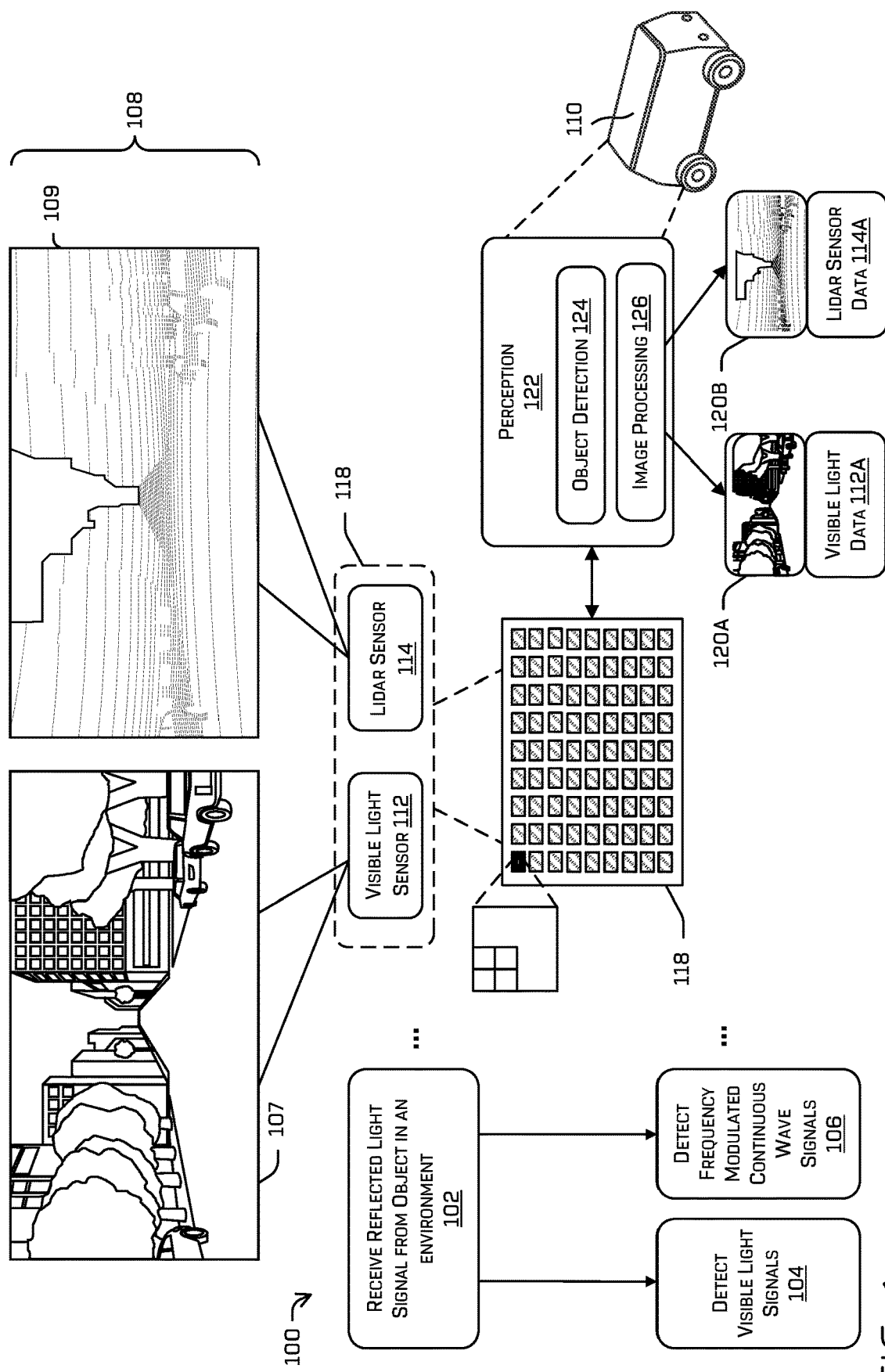
FIG. 1 is a pictorial flow diagram of an example process of capturing data in an environment with a light sensor.

A system and method to detect images using visible and coherent light using a single sensor package are discussed herein. The visible and coherent light may be focused onto a substrate in which visible light sensors and coherent light sensors are co-located. The substrate may be fabricated according to the methods discussed herein. The system may include optics that focus light on the sensors to generate image data and lidar data. For example, the sensor can detect both visible light signals and continuous wave signals, such as frequency modulated continuous wave (FMCW) signals, from light reflected off an object in an environment.

A sensor that detects both visible light and continuous wave signals not only enhances the capabilities of the sensor, but also provides efficiencies and improved processing for systems utilizing such a sensor. For example, machine learning algorithms may be trained more efficiently by using visible light data (e.g., RGB data) and continuous wave data (e.g., depth data) captured simultaneously or substantially simultaneously and/or captured on a light sensor in which visible light data and continuous wave data sensors are co-located. Processing time may also be reduced when utilizing such a sensor. For example, fusing visible light data and continuous wave data from different sensors would no longer be required, and such an arrangement reduces alignment errors and/or calibration issues. These improved efficiencies and processing times can improve user experiences and provide improved safety features. For example, a user of an augmented reality device may realize improved gaming speeds and the braking system on a vehicle may decelerate more quickly with improved object detection.

Various technologies, such as autonomous navigation and augmented reality, utilize the detection and measurement of velocity and distance for objects appearing in an environment. For example, a vehicle for autonomous driving or an unmanned aerial vehicle (UAV) may use three-dimensional detection and recognition in order to safely navigate an environment. Light detection and ranging (lidar) systems are capable of determining such three-dimensional detection by determining a collection of points based on the time of flight of reflected light. In some cases, some conventional time of fight sensors may use a direct measurement of a pulse of light from emission to detection to determine a time of flight, while other conventional time of flight sensors may determine a phase shift between an emitted signal and a detected signal to indirectly determine a time of flight. Such time of flight data can be used to determine data indicative of a range or distance of objects in the environment, also referred to as depth information of a particular field of view of the sensor. While lidar systems provide a source of distance and/or velocity measurements, other sensors may be more capable of detecting other forms of data. For example, some sensors may collect data indicative of visible light reflected from an object in the environment that is able to discern color and other features with a higher resolution than some lidar systems. However, such sensors may not be capable of providing any depth information.

In one example, a sensor can include a first portion that measures range (depth information or a depth value) and a second portion that captures visible light (e.g., color information). In some examples, the first portion may also measure velocity of objects in an environment. Such a light sensor may include an optical array that receives light signals reflected from an object in the environment. The optical array may be comprised of an array of photodetectors that detect frequency modulated continuous wave (FMCW) light signals and visible light signals from the reflected light signals. In one example, a frequency of the continuous wave is modulated by a modulator to provide the FMCW signal. In some examples, the array of photodetectors that detect FMCW light signals and the photodetectors that detect visible light signals are on a same substrate or is integrated into a single sensor package. In some examples, some or all of the pixel data output by the sensor may include image data (e.g., RGB data, intensity data, or otherwise) and depth data.

The image processing apparatus may further include, but is not limited to, a local light source, a waveguide, readout circuitry, and a controller. The light source may be, for example, a pulsed or continuous wave laser that is responsible for outputting the pulsed or continuous wave toward the object in the environment. A portion of the light emitted by the light source is channeled by the waveguide to the depth portion of the light sensor (e.g., to be received as local light). When light is reflected from objects in the environment, the reflected light is received by the light sensor. The light sensor captures the reflected light and transforms the light into electrical signals to be readout by readout circuitry. In some examples, the depth portion of the light sensor receives a portion of the light emitted by the light source as the reflected light. In some examples, the depth portion of the light sensor can be referred to as a coherent pixel. The coherent pixel receives the local light and the reflected light and combines them through a hetrodyne detection process. Based at least in part on a change in frequency between the local light and the frequency as determined by the coherent pixel, the image processing apparatus can determine a depth value associated with a pixel. In a further example, a portion of the visible light is captured by the image sensor portion (e.g., detecting RGB data) of the light sensor to produce visible light signals that is directly associated with the depth value.

FIG. 1 is a pictorial flow diagram of an example process 100 of capturing data in an environment with a light sensor. An operation 102 can include receiving reflected light signals from an object in an environment. In some examples, the light received in the operation 102 can include ambient light in an environment and light emitted by an emitted, as discussed herein. An operation 104 can include detecting visible light signals from the light received in the operation 102 and an operation 106 can including detecting frequency modulated continuous was signals in the light received in the operation 102. The operation 104 can include determining image data 107, and the operation 106 can include determining depth data 109.

In some examples, the process 100 can be performed by a vehicle, such as an autonomous vehicle 110 in an environment 108. An example environment 108 may include any number of objects, including but not limited to a vehicle, a pedestrian, a bicycle, a traffic light, etc.). As shown, the environment 108 includes objects that are detected or otherwise sensed by the vehicle 110. The operation 102 can include processing the detected objects into lidar data, image data, radar data, audio data, time of flight data, and the like. In one example, as described below, an image processing system 126 processes the captured sensor data.

A light sensor 118 may include a visible light sensor portion to receive visible light signals and a lidar sensor portion to receive continuous wave signals, such as a coherent frequency modulated continuous wave (FMCW) signal. The visible light sensor portion 112 (referred to as a "visible light sensor 112" or an "image sensor 112") of the light sensor 118 may be part of any type of image capture device configured to capture images representative of the environment 108, such as, for example, a sensor as part of one or more cameras (e.g., RGB-cameras, monochrome cameras, intensity (grey scale) cameras, infrared cameras, ultraviolet cameras, depth cameras, stereo cameras, etc.). The lidar sensor portion 114 (referred to as a "lidar sensor 114" or a "depth sensor 114") of the light sensor 118 may be any type of lidar sensor, and some examples may include only a single type of sensor or any combination of different types of sensors configured to generate data representative of the environment. Further, though depicted as single sensors for illustrative purposes, any number of visible light sensor(s) 112 and/or lidar sensor(s) 114 are contemplated. Additionally, while the visible light sensor 112 and lidar sensor 114 are illustrated as separate sensors, the visible light sensor 112 and the lidar sensor 114 may be a single sensor (e.g., a monolithic image sensor or a monolithic optical array), such as light sensor 118 that combines the capabilities of the visible light sensor 112 and the lidar sensor 114. In one example, the light sensor 118 is a single FMCW coherent sensor with RGB capability embedded therein, as explained further below.

In the example shown in FIG. 1, and in operation 104, the visible light sensor 112 is depicted as capturing visible light data 112A. Such visible light data 112A may be provided by the visible light sensor 112 to one or more processors and/or other system components of the present disclosure in the form of one or more signals. For example, such signals may include visible light data 112A representing the environment 108. Visible light data 112A may comprise, for example, one or more images illustrating, indicating, and/or otherwise representing the environment 108. In some examples, the visible light data 112A may comprise one or more images captured by the visible light sensor 112, and the visible light data 112A may illustrate, indicate and/or otherwise represent a scene 120A that includes objects of the environment 108 detected by the visible light sensor 112 at a particular time. As will be described below, in some examples, the visible light data 112A is captured on the same light sensor 118 as other sensors (e.g., the lidar sensor 114) and processed by image processing system 126.

The example lidar sensor 114 shown in FIG. 1 is depicted as capturing lidar sensor data 114A, such as coherent FMCW signals. However, it is appreciated that any type of depth measurement data may be captured by the lidar sensor 114. In operation 106, the detected lidar sensor data 114A may be provided by the lidar sensor 114 to one or more processors and/or other system components of the present disclosure in the form of one or more signals. For example, such signals may include lidar sensor data 114A representing the environment 108. The lidar sensor data 114A may illustrate, indicate and/or otherwise represent a scene 120B that includes a respective group of objects as detected by the lidar sensor 114 at a particular time. In examples in which the lidar sensor data 114A is captured simultaneously with the visible light data 112A, the objects included in and/or represented in the scene 120B may be substantially the same (and/or at substantially the same time) as the objects included in the scene 120A associated with the image capture device. In such examples, each data acquisition of the lidar sensor 114 may result in lidar sensor data 114A representative of a respective scene.

In some examples, the lidar sensor data 114A may correspond to multiple data acquisitions of the lidar sensor 114 over time. For example, the lidar sensor 114 may have a light emitter and a light sensor, with the light emitter including one or more lasers that direct highly focused light toward an object or surface, which reflects the light back to the lidar sensor 114, though any other light emission and detection to determine range is contemplated (e.g., flash lidar, MEMS lidar, solid state lidar, Optical Phase Arrays (OPA) lidar, and the like). Measurements of the lidar sensor data 114A may be represented as 3D lidar sensor data having coordinates (e.g., cartesian, polar, etc.) corresponding to positions or distances captured by the lidar sensor 114. For example, the 3D lidar sensor data 114A may include a 3D map or point cloud, which may be represented as a plurality of vectors emanating from a light emitter and terminating at an object or surface. In some examples, converting operations may be used to convert the 3D lidar sensor 114 data to multi-channel two-dimensional (2D) data. In other examples, multi-channel 2D data conversion may not be necessary. In some examples, the lidar sensor data 114A may be automatically segmented, and the segmented lidar sensor data may be used, for example, as input for determining trajectories for the vehicle 110.

In some examples, the visible light sensor 112 and/or the lidar sensor 114 may capture a same field of view (FOV) relative to the environment 108. As a result, each scene 120A and 120B may include respective objects, sensed by the respective sensor, in the environment 108. For example, a signal generated by the visible light sensor 112 may include visible light data 112A representing the first scene 120A. Similarly, a signal generated by the lidar sensor 114 may include lidar sensor data 114A representing the second scene 120B. As explained further below, the visible light sensor 112 and the lidar sensor 114 may be a single sensor, such as light sensor 118, in which signals for the visible light data 112A and the lidar sensor data 114A are captured and generated by a single sensor (i.e., light sensor 118). In any of the examples described herein, the visible light data 112A and the lidar sensor data 114A may be captured by the respective sensors 112 and 114 (or together as light sensor 118) substantially simultaneously. In such examples, the scenes 120A and 120B may comprise substantially simultaneous representations of the environment 108. For example, the two sensors may share the same origin. Additionally, in such examples, the objects in scene 120A may include substantially the same objects as in scene 120B.

As shown in FIG. 1, the example process 100 may include communicating the visible light data 112A and/or the lidar sensor data 114A to one or more processors configured to identify one or more objects in the environment 108 based at least in part on such data. In some examples, the one or more processors may include and/or may be in communication with a perception system 122. The one or more processors and/or the perception system 122 may be configured to receive respective signals from the light sensor 118 comprising the visible light sensor 112 and/or the lidar sensor 114.

Figure 6:
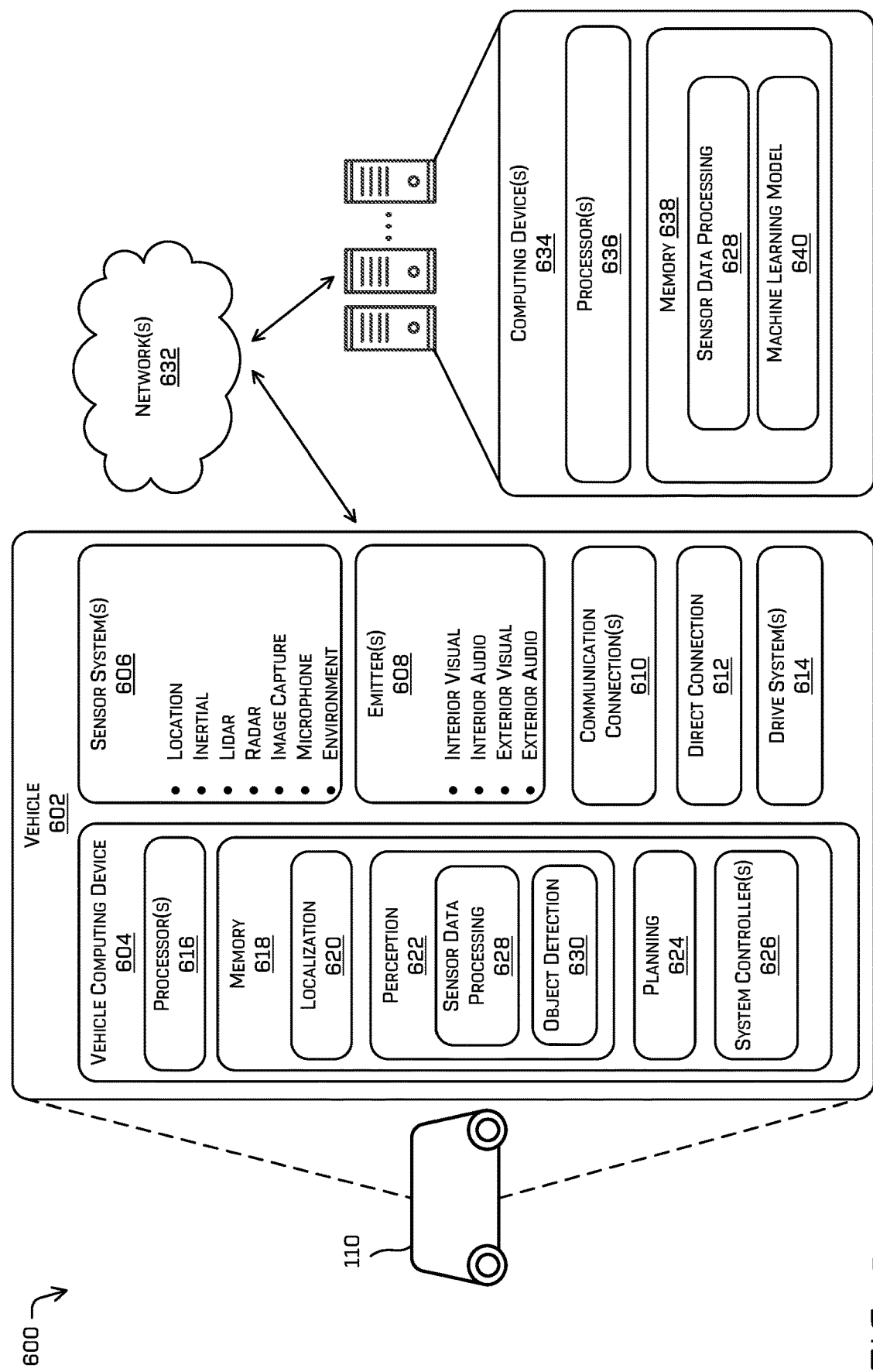
FIG. 6 is a block diagram illustrating an example system for implementing one or more of the example processes described herein.

In some examples, the perception system 122 may utilize one or more algorithms, neural networks and/or other components to identify each object and/or parameters of each object (e.g., extents, sizes, orientations, etc., and/or uncertainties associated with each parameter). For example, the perception system 122 may use one or more data association engines, object recognition engines, object classification engines, and/or other components to correlate the output of the individual sensor modalities described herein to a particular object, thereby identifying the object (or a group of objects). In some examples, the perception system 122 may also be in communication with a machine learning system (FIG. 6). In such examples, the machine learning system may be used to associate the lidar sensor data 114A, including depth data, with visible light data 112A captured by the visible light sensor 112. In other examples, sparsely captured visible light data 112A and/or lidar sensor data 114A may be associated with high-resolution visible light data 112A, for example, using machine learning.

An object detection system 124 associated with the perception system 122 may detect and/or otherwise determine a particular location of objects within the environment 108. The location may comprise coordinates (e.g., cartesian, polar, GPS, map data, etc.) identifying the position of objects in the environment 108 and/or the type of object detected. In some examples, the visible light data 112A indicating objects in scene 120A may be determined by the visible light sensor 112 at a first time. Additionally, the lidar sensor data 114A indicating the objects in scene 120B may be determined by the lidar sensor 114 substantially simultaneously with the visible light data 112A (e.g., at the first time). In such examples, the perception system 122 may identify the objects and may determine a particular location of the objects corresponding to the first time.

Figure 2A:
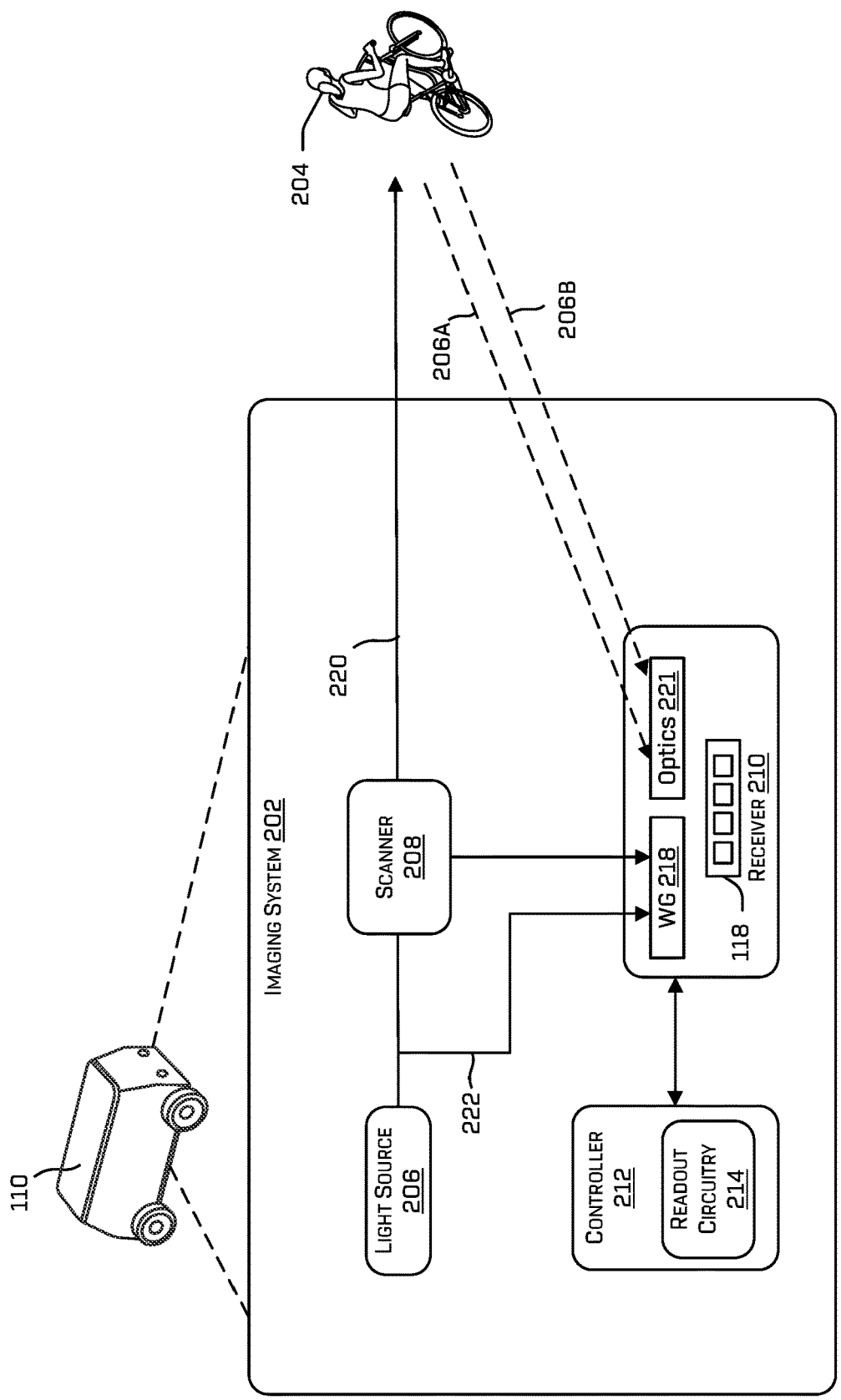
FIG. 2A illustrates an example imaging system to capture sensor data in accordance with the system of FIG. 1.

FIG. 2A illustrates an example imaging system to capture sensor data in accordance with the system of FIG. 1. The imaging system 202 is an optical remote sensing technology that can measure distance to and can capture visible properties of object in an environment. Such an object can be illuminated by a natural light source or visible light source, such as the sun, or local light source, such as a laser. In one example, the imaging system 202 includes a receiver 210 configured to sense or detect objects (e.g., cyclist 204) in an environment 108 in which a vehicle 110 is located. The imaging system 202 may include the light sensor 118 comprising an image sensor and a depth sensor.

In an example, the imaging system 202 utilizes a light source 206 (e.g., a laser) and/or scanner 208 configured to emit laser pulses (e.g., light) 220 and the receiver 210 is configured to receive reflections 206A and 206B from the environment. For example, the receiver may receive the reflection 206A of the light 220 from objects in the environment 108. The receiver 210 is also configured to receive a reflection 206B of passive light. For example, the receiver 210 may receive the reflection 206B of sunlight reflected from objects in the environment. The receiver 210 may receive the light 206A and 206B via optics 221 and direct the light 206A and 206B toward a sensor, such as light sensor 118. The reflections 206A and 206B detected by the light sensor 118 may optionally be mixed with the frequency of a local oscillator, shown as line 222, to allow the measurement of frequencies and the calculation of range and velocity of the object 204. In one example, the receiver 210 includes a waveguide (WG) 218 to guide the reflected light toward the light sensor 118, although other mechanisms may be used to achieve this purpose.

In one example, the light source 206 may include, for example, a laser which emits light having a particular operating wavelength in the infrared, visible, or ultraviolet portions of the electromagnetic spectrum. As an example, light source 206 may include a laser with one or more operating wavelengths between approximately 900 nanometers (nm) and 2000 nm. For example, the light source 206 may emit light 220 in the form of an output beam which may be continuous wave (CW), pulsed, or modulated in any suitable manner for a given application. The light 220 is directed toward an object (target) in the environment 108, such as object 204. Once the light 220 reaches the object 204, the object 204 may scatter or reflect at least a portion of light 220. Some of the scattered or reflected light may return toward the imaging system 202. In the depicted example, the scattered or reflected light (i.e., reflections 206A and 206B) passes through the scanner 208 and is directed to receiver 210. The receiver 210 may also be referred to as a photoreceiver, optical receiver, optical sensor, detector, photodetector, or optical detector. Although only two reflections are shown in the depicted example, it is appreciated than any number of reflections may be scattered from any number of objects in the environment.

In some examples, receiver 210 may receive or detect the reflections 206A and 206B in the form of photons and produce one or more representative signals. For example, the reflections 206A and 206B are directed to the light sensor 118 and produce an electrical output signal that is representative of the reflections 206A and 206B. As an example, if the reflections 206A and 206B include an optical pulse, then receiver 210 may produce an electrical current or voltage pulse that corresponds to the optical pulse detected by the receiver 210. As another example, receiver 210 may include one or more avalanche photodiodes (APDs) or one or more single-photon avalanche diodes (SPADs). As another example, the receiver 210 may include one or more PN photodiodes (e.g., a photodiode structure formed by a p-type semiconductor and a n-type semiconductor) or one or more PIN photodiodes (e.g., a photodiode structure formed by an undoped intrinsic semiconductor region located between p-type and n-type regions). A photodetector may have an active region or an avalanche-multiplication region that is formed with, is doped with, or otherwise includes silicon, germanium, InGaAs, and/or AlInAsSb (aluminum indium arsenide antimonide). The active region may refer to an area over which a detector may receive or detect input light.

The electrical signals may be sent, for example, to a controller 212 for further processing. In one example, the controller 212 may include a processor, computing system (e.g., an ASIC or FPGA), or other suitable circuitry, such as readout circuitry 214 (described below with reference to FIG. 4). In some examples, the processor, computing system or readout circuitry may alternatively be part of the receiver 210. The controller 212 may be configured to analyze characteristics of the electrical signals output from the light sensor 118 to determine characteristics about the object 204, such as its distance downrange from the imaging system 202. This may be done, for example, by analyzing a time of flight or a frequency or phase of a transmitted light from the light source 206 or a received reflection 206A or 206B.

In examples, light source 206 may include a pulsed or continuous wave (CW) laser. In some examples, light source 206 may have a substantially constant pulse repetition frequency, or light source 206 may have a variable or adjustable pulse repetition frequency. The light source 206 may include a laser diode, such as for example, a distributed Bragg reflector (DBR) laser, a fiber laser or a solid-state laser. As an example, light source 206 may include an aluminum-gallium-arsenide (AlGaAs) laser diode, an indium-gallium-arsenide (InGaAs) laser diode, an indium-gallium-arsenide-phosphide (InGaAsP) laser diode, or a laser diode that includes any suitable combination of aluminum (Al), indium (In), gallium (Ga), arsenic (As), phosphorous (P), boron (B), or any other suitable material. In some examples, light source 206 may include a pulsed or continuous wave laser diode with a peak emission wavelength between 1200 nm and 1600 nm. As an example, light source 206 may include a current-modulated InGaAsP DFB laser diode that produces optical pulses at a wavelength of approximately 1550 nm.

In some examples, imaging system 202 may include one or more optical components, such as the optics 221, configured to reflect, focus, or direct light within the imaging system 202 or light produced or received by the imaging system 202. More specifically, the optics 221 may include one or more lenses, or one or more mirrors configured to expand or focus the light to a desired beam diameter or divergence. For example, the imaging system 202 may include the optics 221 to focus the reflections 206A and 206B onto the light sensor 118 (e.g., photodetector) of receiver 210. As another example, the optics 221 may include one or more mirrors (e.g., concave, convex, or parabolic mirrors) to direct or focus the light.

In one example, as indicated above, the imaging system 202 may include a scanner 208 configured to scan light from the light source 206 across a field of regard (FOR) of the imaging system 202. As an example, scanner 208 may include one or more scanning mirrors configured to pivot, rotate, oscillate, or move in an angular manner about one or more rotation axes. The light may be reflected by a scanning mirror, and as the scanning mirror pivots or rotates, the reflected light may be scanned in a corresponding angular manner. In some examples, a scanning mirror (which may be referred to as a scan mirror) may be attached to or mechanically driven by a scanner actuator or mechanism which pivots or rotates the mirror over an angular range covering any number of different angular ranges. In still other examples, the scanner 208 is a solid-state scanning device. A solid-state scanning device may refer to a scanner that scans an output light beam without the use of moving parts (e.g., without the use of a mechanical scanner, such as a mirror that rotates or pivots). For example, a solid-state scanner may include an optical phased array scanning device, a liquid-crystal scanning device, a liquid lens scanning device, etc.

The controller 212 may be located within or separate from the imaging system 202. In one example, the controller is a processor, such as processor 616 (FIG. 6). In some examples, controller 212 may be electrically coupled or communicatively coupled to light source 206, scanner 208, and/or receiver 210. As an example, controller 212 may receive electrical trigger pulses or edges from light source 206, where each pulse or edge corresponds to the emission of an optical pulse by light source 206. As another example, controller 212 may provide instructions, a control signal, or a trigger signal to light source 206 indicating when light source 206 should produce optical pulses. Controller 212 may send an electrical trigger signal that includes electrical pulses, where each electrical pulse results in the emission of an optical pulse by light source 206. In other examples, controller 212 may determine a time-of-flight value for an optical pulse based on timing information associated with when the pulse was emitted by light source 206 and when a portion of the pulse was detected or received by receiver 210.

As discussed throughout the disclosure, the light sensor 118 can include both visible light sensing elements and depth sensors. For example, the visible light sensor 112 of the light sensor 118 may be any one or more of an RGB-cameras, monochrome cameras, intensity (grey scale) cameras, infrared cameras, ultraviolet cameras, depth cameras, stereo cameras, etc. In one example, a charged couple device (CCD) or a complementary metal-oxide semiconductor (CMOS) camera may capture the intensity of light returned from reflections off objects in the environment 108, along with any desired texture and color information.

The information captured by the light sensor 118 may be provided to the controller 212. During image capture operations, light may be focused, for example by the optics 221, onto the light sensor 118. The light sensor 118 may include photosensitive elements (i.e., pixels) that convert the light into digital data, as explained above and further below.

In some examples, the imaging system 202 may be a FMCW lidar system where the emitted light from the light source 206 includes frequency-modulated light. The FMCW lidar system uses frequency-modulated light to determine the distance to an object in the environment 108 based on a modulation frequency of the received light (which is scattered by the object) relative to the modulation frequency of the emitted light. In one example, a round-trip time for the emitted light to travel to an object and back to the FMCW imaging system may correspond to a frequency difference between the received scattered light and a portion of the emitted light.

Figure 2B:
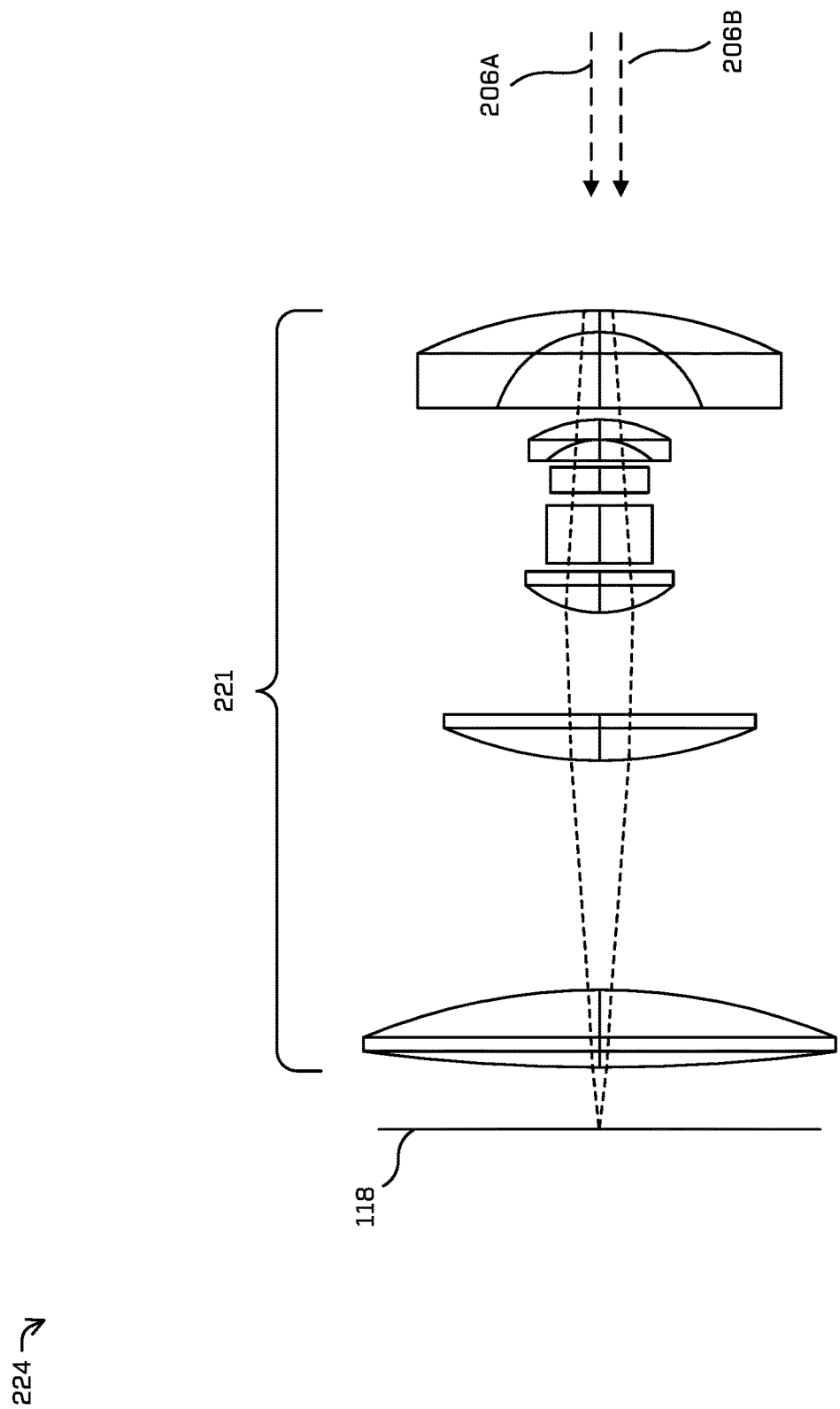
FIG. 2B illustrates an example optical arrangement for implementation in the imaging system of FIG. 2A.

FIG. 2B illustrates an example optical arrangement 224 (e.g., a lens arrangement) for implementation in the imaging system of FIG. 2A.

In some examples, the arrangement can be optimized for receiving light for the visible image sensor 112 and the lidar sensor 114.

In some examples, the arrangement 224 can include a f value of 5.5 and an F-Theta distortion of less than 15%. In some examples, the arrangement 224 can be telecentric in image space. In some examples, the arrangement 224 can equally weight wavelengths in the frequency range of approximately 1540 nm-1560 nm.

In some examples, the arrangement 224 can be implemented with the following summary features:

- Lens Construction: 7G [No Aspheres] (e.g., seven spheric elements)
- Total Track Length (TTL)=47.32 mm
- Distortion: 0.3% (F-Theta)
- Image Circle: 12.728 mm (84.54 deg)
- HFOV/VFOV: 60 deg
- Effective Focal Length (EFL): 8.6 mm
- Aperture: F/5.45

Figure 3:
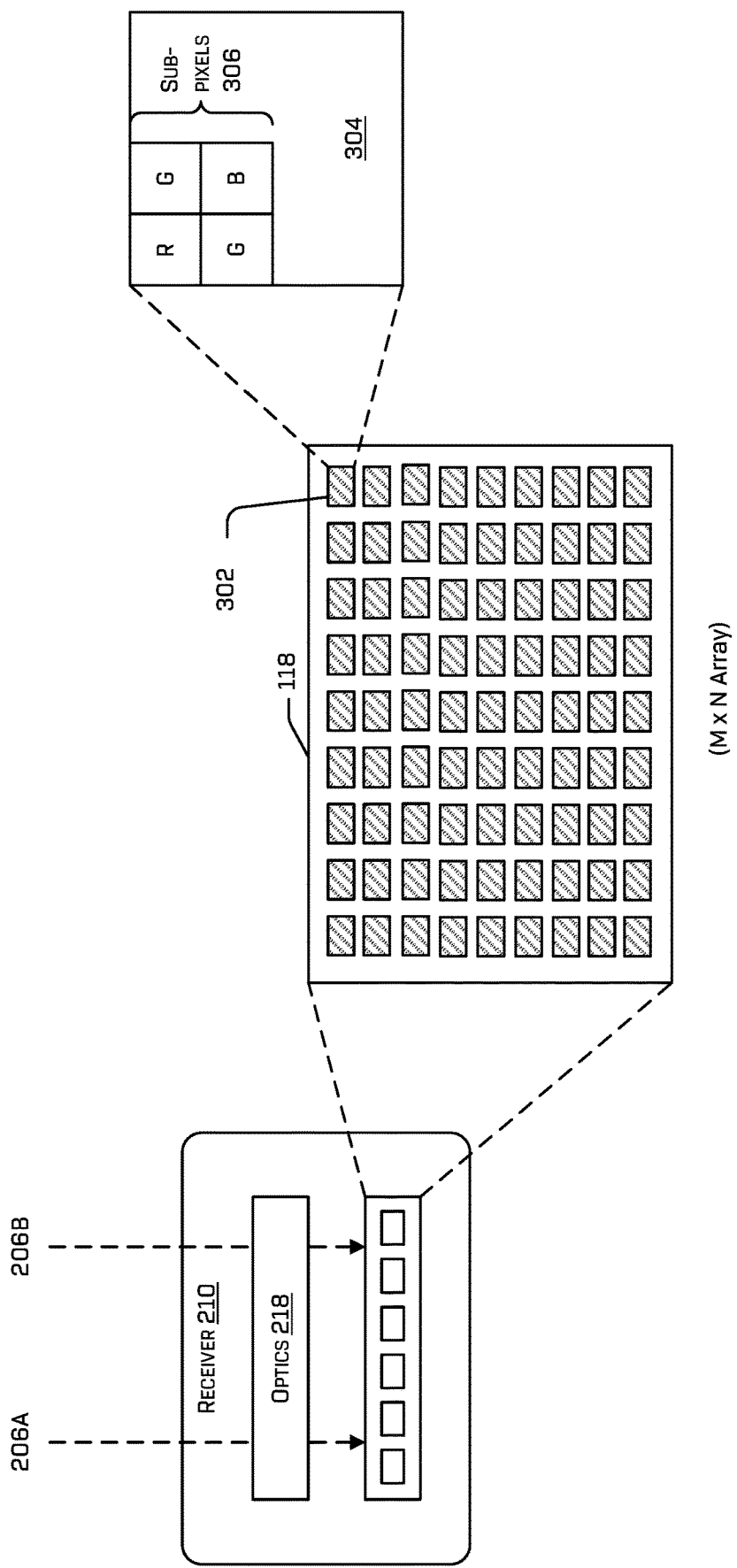
FIG. 3 shows a detail view of the light sensor illustrated in FIG. 2A.

FIG. 3 shows a detail view of the light sensor illustrated in FIG. 2. As discussed above, the imaging system 202 is configured to emit light 220 into the environment 108 and receive reflected or otherwise responsively emitted light (e.g., reflections 206A and 206B) from the environment 108, which reflected light 206A and 206B is received by receiver 210 and is guided by optics 221 toward the light sensor 118. Further the receiver 210 can include the waveguide 218 to guide light produced by the light source 206 to the light sensor 118 for combining the reference light with the reflected light. When reflected light 206A and 206B is received at the light sensor 118, optics (e.g., lenses, mirrors, diffraction gratings) may receive the reflected light and be configured to pass light toward/receive light from a specific direction and/or to focus such light, to filter out one or more wavelengths, bands of wavelengths, polarizations, or other specified properties of such light, or to otherwise interact with or modify such light.

In some examples, the light sensor 118 may be a solid-state sensor that includes a sensor array, such as a one-dimensional or two-dimensional array of photosensors or photodetectors 302. The two-dimensional array may be arranged in a rectangular, circular or any other shape. In one example, the light sensor 118 is configured as an array of photodetectors 302. A photodetector 302 may be, for example, an avalanche photodiode (APD) or a single photon avalanche diode (SPAD). The photodetector 302 may measure properties such as power, phase, or duration of the reflected light and generate a corresponding current output. In some examples, the photodetector 302 may operate in the infrared or near-infrared wavelength.

In some examples, a photodetector 302 can include a collection of photodetectors (also referred to as pixels) made up of light sensitive elements. In some examples, a single photodetector 302 may be associated with a single light sensitive element present in the light sensor 118. In other examples, a single photodetector 302 may be associated with a plurality of light sensitive elements present in the light sensor 118. In one example, when the light sensor 118 receives the incident light via optics 221 and light from the light source 206 via the waveguide 218. In one example, the waveguide 218 is a single-mode waveguide that combines received light signals with the frequency of local oscillator signal 222. In other examples, the waveguide 218 may be a multi-mode waveguide in which to combine the received light signals with the frequency of the local oscillator signal 222. The light sensor 118 may then transfer the captured signals as a voltage or a digital signal, depending on the type of sensor. For example, as noted above, the light sensor 118 may be a digital imaging sensor, such as a CCD sensor or a CMOS sensor. To capture visible light signals, the sensors may include a color filter (or color filter array) that absorbs undesired color wavelengths such that each pixel in the sensor is sensitive to a color wavelength, as described more below with reference to FIGS. 4 and 5.

In examples, the light sensor 118 may include any suitable M×N array of photodetectors 302, where M and N are integers. For example, the array may be a 4×4, 10×10, 50×50, 100×100, 100×500, 200×1,000, 640×480, or 1,000×1,000 array of photodetectors 302. In the depicted example, a detail top view of the light sensor 118 shows a 9×9 photodetector array. Each photodetector 302 in a detector array may be individually controllable or addressable. For example, the receiver 210 may be configured to activate or detect light using only four photodetectors. The other photodetectors may be inactivated, or the photocurrents produced by the remaining detectors may be disregarded.

Each photodetector 302 in the array may include any suitable type of photodetector, such as for example, an APD, SPAD, PN photodiode, or PIN photodiode. Additionally, each photodetector 302 may include any suitable combination of one or more of the following elements: silicon (Si), germanium (Ge), tin (Sn), indium (In), gallium (Ga), arsenic or arsenide (As), phosphorous or phosphide (P), and antimony or antimonide (Sb). For example, a photodetector 302 may be a PIN photodiode or an APD with an active region or an avalanche-multiplication region that is formed with, is doped, or otherwise includes, silicon, germanium, germanium-silicon (GeSi), germanium-tin (GeSn), germanium-silicon-tin (GeSiSn), InGaAs, InGaAsP, or AlInAsSb. The photodetector 302 may be configured to detect light at one or more wavelengths between approximately 900 nm and approximately 1700 nm. The photodetectors 302 may be configured to detect visible light (e.g., light between approximately 380 nm and approximately 750 nm). In one example, the photodetectors 302 may be configured to detect the reflections 206A and 206B, which may have a wavelength of 1400-1600 nm). The photodetector 302 may produce one or more respective photocurrent signals corresponding to the coherent mixing of the local oscillator signal 222 and the reflection 206A and/or 206B. The photodetectors 302 may further be configured to detect visible light that is emitted, scattered, or reflected by objects located in the environment 108. The visible light may include ambient light (e.g., sunlight) or light produced by other sources (e.g., streetlights or vehicle headlights). In some examples, one or more of the photodetectors 302 may include optical filters so that each photodetector 302 detects a particular wavelength range or color of visible light (e.g., red, blue, or green light).

As referred to herein, the photodetector 302 can comprise a lidar sensing photodetector 304 and visible light sensing sub-pixels 306.

Once the sensor data has captured and detected by the light sensor 118, the captured sensor data may be processed into the image data 112A and the lidar sensor data 114A by the sensor data processing system 628. According to some examples, the sensor data processing system 628 may reside in the perception system 622 of the vehicle 110, the computing device(s) 634 and/or the vehicle computing device 602. In some examples, the sensor data processing system 628 may be configured to perform image processing on images.

Figure 4:
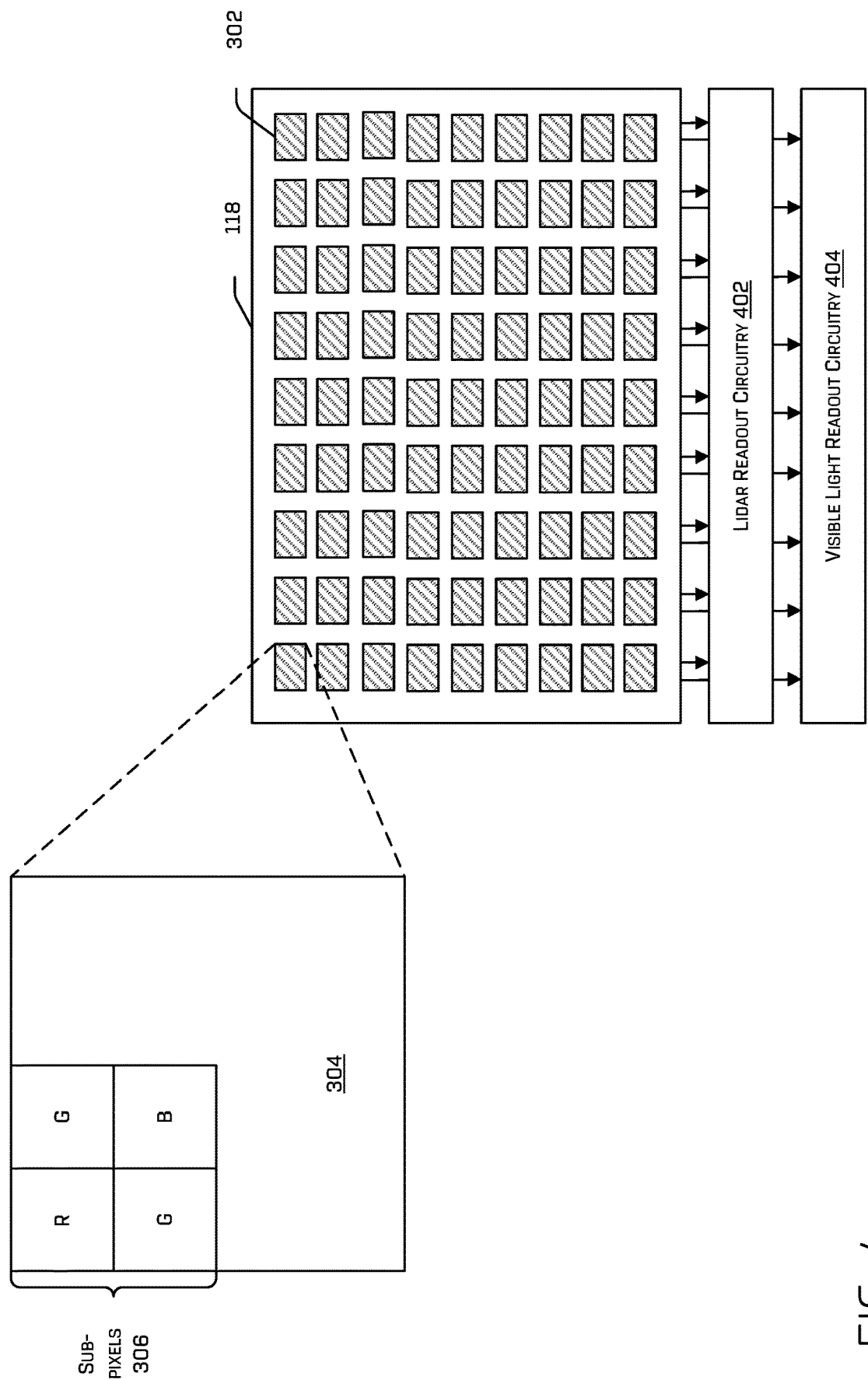
FIG. 4 illustrates a detailed example of the light sensor of FIG. 3 including a visible light sensing portion and readout circuitry.

FIG. 4 illustrates a detailed example of the light sensor of FIG. 3, including a visible light sensing portion and readout circuitry. The light sensor 118 includes a photodetector array that includes both visible light sensors 112 and lidar sensors 114, where the array is an M×N array of photodetectors 302. The photodetectors 302 in the array provide an output signal indicative of a round trip propagation time of a light signal (e.g., from a laser or other light source) incident thereon. For example, the photodetectors 302 may include a depth photodetector 304, which may be lidar sensing photodetectors, such as a coherent FMCW light sensor. The visible light sensor 112 may include one or more image sensing photodetectors, also referred to as a sub-pixel or photodetector element. The sub-pixels 306 may provide an output signal indicative of the number of charges collected from light incident thereon over a period of time. In some examples, the sub-pixels 306 and lidar sensing photodetectors 304 are co-located or co-arranged on a same semiconductor substrate (e.g., on the same chip or die) to provide image registration between features detected by the visible light sensor 112 and the lidar sensor 114 of objects in the environment 108. For example, the light sensor 118 may be a pixelated coherent photodetector with coherent photodetectors sensitive to light having a frequency of 1550 nm. In a further example, the sub-pixels 306 may be intensity pixels.

In one example, each of the photodetectors 302 in the light sensor 118 may comprise an M×N micron area, such as a 50×50 micron area. In one example, within this M×N area, the sub-pixels 306 are RGB sub-pixels and may be embedded within photodetector 302 of the light sensor 118. For example, and as depicted, the sub-pixels 306 reside within one or more of the lidar sensing photodetectors 304. In an example, the sub-pixels 306 may comprise a 5×5 micron area (or less) of the photodetector 302. Significantly, with the sub-pixels embedded (i.e., co-located) in the coherent photodetector (lidar sensing photodetector), the light sensor 118 may provide simultaneous lidar sensor data 114A (e.g., FMWC data) and visible light sensor data 112A (e.g., color or RGB data). Such simultaneous output would otherwise require two separate and independent sensors that would need to be synchronized and calibrated to provide the same simultaneous data. Additionally, integration of different sensors may require less components and save space by using shared optics to acquire information for both the visible light sensor and the lidar sensor.

In some examples, the light sensor 118 can be fabricated as a single sensor package. For example, silicon wafers and germanium wafers (or other materials discussed herein) can be manufactured separately and bonded together such that the image sensor 112 and the lidar sensor 114 are co-located in a single sensor package. In some examples, germanium layer(s) can be grown on a silicon substrate and etched and doped as need to generate the image sensor 112 and the lidar sensor 114 (e.g., portions of the sensor for capturing the respective image data and depth data).

Although depicted as one array of sub-pixels 306 in the lidar sensing photodetector 302, any number of sub-pixels 306 may be employed in the lidar sensing photodetector 302 of the light sensor 118. For example, additional or alternative sub-pixels 306 (shown as dashed lines) may be used in the light sensor 118. In one example, one or more sub-pixels 306 may replace the lidar sensing photodetectors 304. In another example, one or more sub-pixels 306 may be embedded in one or more of the lidar sensing photodetectors 304, such that the sub-pixels 306 are sub-pixels of a lidar sensing photodetector 304, as illustrated. Additionally, although the sub-pixels 306 are shown in the corners of the photodetectors 302, the sub-pixels 306 are not limited to such a location and may be formed at any photodetector 302 location within the array of photodetectors 302.

In examples, the sub-pixels 306 and the lidar sensing photodetectors 304 may include wavelength filters overlying or otherwise arranged in the optical path of the sub-pixels 306 and the lidar sensing photodetectors 304 to allow for detection of the desired wavelengths of light. For example, a filter that is configured to allow light of wavelengths corresponding to the near-infrared (NIR) wavelength band or range to pass therethrough is arranged above one or more of the lidar sensing photodetectors 304. In this case, the NIR wavelength range may include wavelengths of about 780 nm to about 2500 nm. Arranged above the sub-pixels 306 may be color filter arrays to generate color image data. In some examples, the color filter array may include a Bayer filer, although any color filter array may be used. In some examples, no color filter array may be included. As illustrated, sub-pixels may be associated with filters configured to allow light of wavelengths corresponding to the Red, Green, Green, and Blue (RGGB) wavelength bands or ranges to pass therethrough, as illustrated. The red wavelength range may include wavelengths of about 615 nm to about 750 nm, the green wavelength range may include wavelengths of about 495 nm to about 580 nm, and the blue wavelength range may include wavelengths of about 415 nm to about 490 nm.

Also included as part of the light sensor 118 is readout circuitry (e.g., lidar readout circuitry 402 and visible light readout circuitry 404). After each sub-photodetector 306 (the visible light sensor portion of the photodetector) and/or photodetector 304 in photodetector array of light sensor 118 has acquired data, the visible light sensor data 112A is read out by visible light readout circuitry 404 and the lidar sensor data 114A is read out by the lidar readout circuitry 402. The visible light sensor data 112A and the lidar sensor data 114A are then transferred to the controller 212 or another processor (e.g., processors 616 or 636) for processing, etc. In one example, the readout circuitry 402 and 404 can include amplification circuitry, analog-to-digital ("ADC") conversion circuitry, or other circuits. In some examples, the controller 212 (or processors 616 or 636) is coupled to the light sensor 118 to control operational characteristic of the photodetector array.

Although shown as two separate readout circuits, the lidar readout circuitry 402 and visible light readout circuitry 404 may be a single readout circuitry. The readout circuitry may also be triggered substantially simultaneously.

FIGS. 5A-5D illustrate examples arrangements of the photodetector in the light sensor in accordance with the example of FIGS. 3 and 4. To capture light signals, the light sensor, such as light sensor 118, may include a color filter (or photodetector filter) that absorbs undesired color wavelengths such that each photodetector in the light sensor 118 is sensitive to a color wavelength. For example, the light sensor 118 may use a Bayer pattern of photodetectors (pixels) and photodetector filters. In such a photodetector array, the light sensor 118 includes individual optical filters that transmit red, green or blue colors and that are disposed at or coated on the individual photodetectors. The three-color filters Red, Green, Blue (RGB) not only pass ranges of wavelengths or spectral bands that are corresponding to red, green and blue colors, they also pass through a significant amount of light having wavelengths in the infrared (IR) or near infrared (NIR) region or band of the spectrum. Therefore, the color image sensitivity or quantum efficiency spectrum typically has a rich IR or NIR response even with the R, G, and B color photodetectors.

Figure 5A:
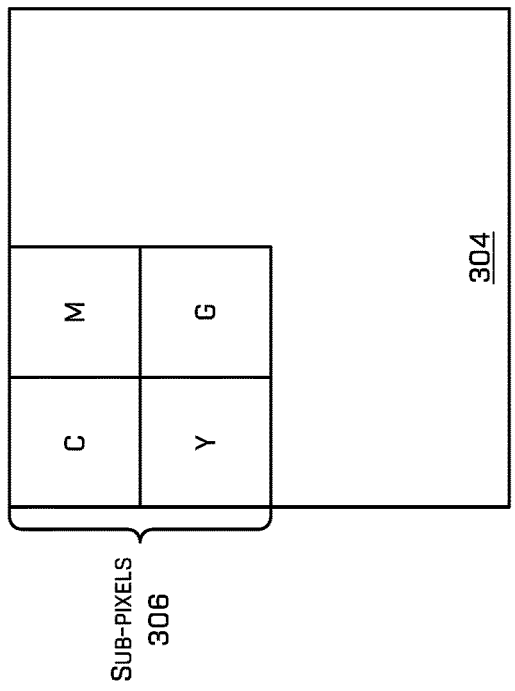
FIGS. 5A-5D illustrate example arrangements of the photodetector in the light sensor in accordance with the example of FIG. 4.
Figure 5B:
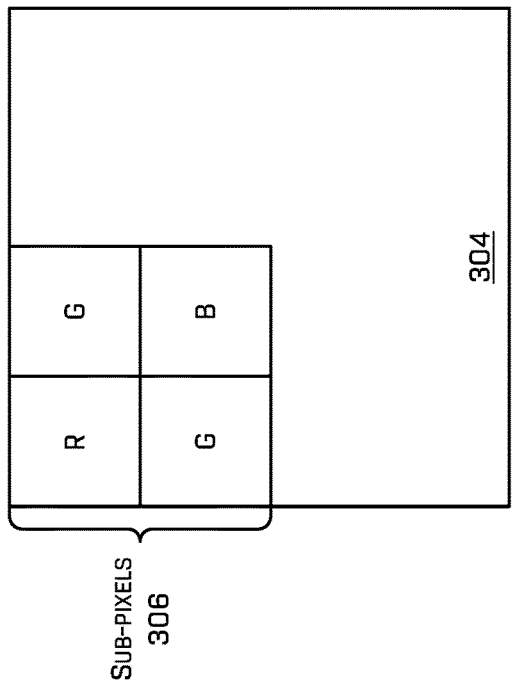

FIGS. 5A and 5B illustrate two color filters—an RGB Bayer color filter pattern and a Cyan, Magenta, Yellow, Green (CMYG) color filter pattern. As shown, the Bayer color filter pattern has a red-green-green-blue (RGGB) 2×2 color filter kernel, configured such that its red and blue sub-pixels are surrounded vertically and horizontally by green sub-pixels. As a single color is sampled at each sub-pixel 306, color interpolation can be performed to create an estimate of each color at each sub-pixel 306. For example, at a blue photodetector of the Bayer pattern, green may be estimated as the average of the four neighboring green photodetectors. Thus, interpolation on a kernel with "n" different colors will result in different signals for each sub-pixel 306, each corresponding to a different color.

Figure 5C:
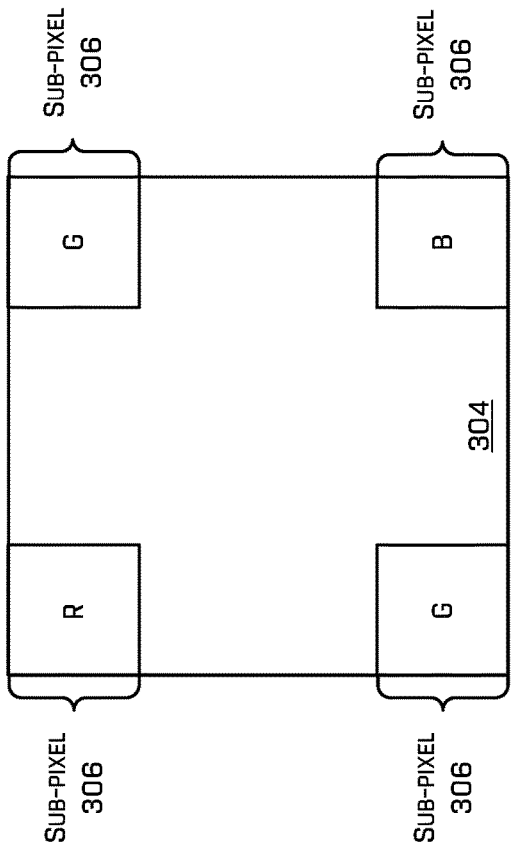

Referring to FIG. 5C, the photodetector array has a filter pattern that is derived from the Bayer pattern, where one of the green (G) filters or sub-pixels 306 is replaced by an infrared (IR) filter or sub-pixel 306. The IR filter has an optical filter that limits or reduces or substantially precludes light or electromagnetic energy in the visible band or region of the spectrum so as to pass or substantially pass IR energy. For example, energy having a wavelength at or above about 700 nm is passed therethrough so that the sub-pixel 306 principally senses IR energy or NIR energy. The RGB sub-pixel may have a filter similar to a conventional Bayer pattern imaging sensor, while the IR sub-pixel has a filter that cuts off light in the visible spectrum and passes only light in the NIR or IR band or region of the spectrum.

Figure 5D:
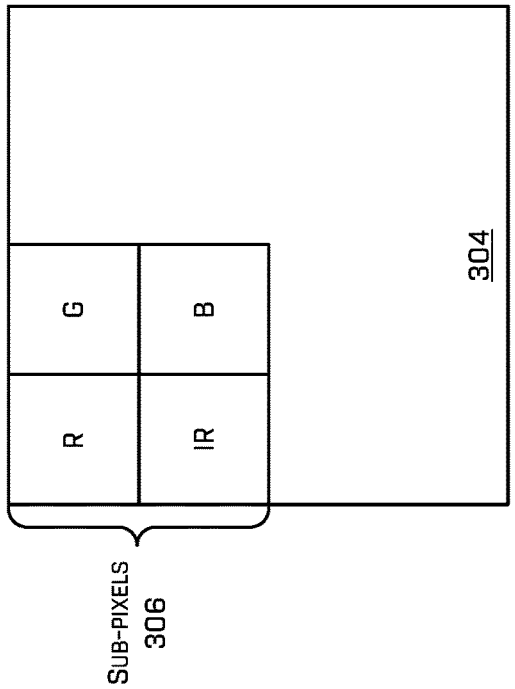

Turning to FIG. 5D, illustrated is an example of a color filter array similar to the array in FIG. 5A. In this example, the sub-pixel 306 are dispersed at each corner the lidar sensing photodetector 304. While depicted at each corner of the lidar sensing photodetector 304, each sub-pixel 306 may be arranged in any location within the lidar photodetector 304 and is not limited to the disclosed example. Additionally, while four sub-pixel 306 are shown as RGGB, any number of different variations may be used—e.g., R, G, IR, B; MCYG; etc.

It is appreciated that FIGS. 5A-5D are exemplary and that any number of different arrangements may be formed in the light sensor (photodetector array).

FIG. 6 is a block diagram illustrating an example system for implementing one or more of the example processes described herein. For example, the system 600 may be configured to identify objects and initiate responses based at least in part on the sensor data described herein. In at least one example, the system 600 can include a vehicle 110 described above with reference to FIGS. 1 and 2.

The vehicle 110 can include a vehicle computing device 604, one or more sensor systems 606, one or more emitters 608, one or more communication connections 610, at least one direct connection 612, and one or more drive system 614.

The vehicle computing device 604 can include one or more processors 616 and memory 618 communicatively coupled with the one or more processors 616. In the illustrated example, the vehicle 110 is an autonomous vehicle; however, the vehicle 110 could be any other type of vehicle. In the illustrated example, the memory 618 of the vehicle computing device 604 stores a localization system 620, a perception system 622, a planning system 624, one or more system controllers 626, and an object detection system 630. Though depicted in FIG. 6 as residing in memory 618 for illustrative purposes, it is contemplated that the perception system 622, object detection system 630, and/or other components of the vehicle computing device 604 may additionally, or alternatively, be accessible to the vehicle 110 (e.g., stored remotely).

In at least one example, the localization system 620 can determine where the vehicle 110 is in relation to a local and/or global map based at least in part on sensor data received from the sensor system(s) 606, the perception system 622 to perform entity detection, segmentation, and/or classification based at least in part on sensor data received from the sensor system(s) 606, and the planning system 624 to determine routes and/or trajectories to be used to control the vehicle 110 based at least in part on sensor data received from the sensor system(s) 606. Additional details of localizer systems and planning systems that are usable can be found in U.S. patent application Ser. No. 14/932,963, filed Nov. 4, 2015, entitled "Adaptive Mapping to Navigate Autonomous Vehicle Responsive to Physical Environment Changes," and Ser. No. 15/632,208, filed Jun. 23, 2017, entitled "Trajectory Generation and Execution Architecture," both of which are incorporated herein by reference in their entirety and for all purposes. In an example where the vehicle 110 is not an autonomous vehicle, one or more such components can be omitted from the vehicle 110.

In at least one example, the localization system 620 and/or the planning system 624 can process sensor data received from the sensor system(s), and can send their respective outputs, over one or more network(s) 632, to one or more remote computing device(s) 634 (e.g., one or more server computers or other computing devices). In such examples, the sensor system(s) 606 may include the visible light sensor 112 and/or the lidar sensor 114 (collectively, the light sensor 118) described above. In at least one example, the localization system 620, perception system 622, and/or the planning system 624 can send their respective outputs to the one or more remote computing device(s) 634 at a particular frequency, after a lapse of a predetermined period of time, in near real-time, etc.

In at least one example, the one or more system controller(s) 626 can be configured to control steering, propulsion, braking, safety, emitters, communication, and other systems of the vehicle 110. These system controller(s) 626 can communicate with and/or control corresponding systems of the drive system(s) 614 and/or other components of the vehicle 110.

In at least one example, the perception system 622 can process the sensor data to perform object detection, segmentation, and/or classification. In some examples, the perception system 622 can provide processed sensor data that indicates the presence of an object (e.g., the object 204 described above with respect to FIG. 2) that is proximate to the vehicle 110 and/or a classification of the object as an object type (e.g., car, pedestrian, cyclist, barrier, road sign, unknown, etc.). In additional and/or alternative examples, the perception system 622 can provide processed sensor data that indicates one or more characteristics associated with a detected entity and/or the environment in which the entity is positioned. In some examples, characteristics associated with an object 204 identified by the perception system 622 can include, but are not limited to, an x-position (global position), a y-position (global position), a z-position (global position), an orientation, an object type (e.g., a classification), a velocity of the object, etc. Characteristics associated with the environment can include, but are not limited to, a presence of another object in the environment, a state of another object in the environment, a time of day, a day of a week, a season, a weather condition, an indication of darkness/light, etc.

For example, sensor system(s) 606 may include image capture devices, such as any cameras (e.g., RGB-cameras, monochrome cameras, intensity (grey scale) cameras, infrared cameras, ultraviolet cameras, depth cameras, stereo cameras, and the like). Such image capture devices may include a visible light sensor 112 and may capture image data, such as visible light data 112A, indicating the group of objects, and the sensor system(s) 606 may transmit image data to the perception system 622 and/or other systems of the vehicle computing device 604 for subsequent processing.

Likewise, the sensor system(s) 606 may include one or more lidar sensors 114 configured to capture lidar sensor data 114A for use, as described herein. For example, the sensor system(s) 606 may be configured to combine or synthesize lidar data from a plurality of lidar sensors 114 to generate a meta spin of lidar data, which may be lidar sensor data 114A generated by multiple lidar sensors 114. In the case of a meta spin of lidar data, the sensor system(s) 606 may be configured to determine a virtual origin (e.g., common origin) of the meta spin data. In some examples, the sensor system(s) 606 may be configured to determine a range between a lidar sensor 114 and a point of an object or surface, and in some examples, the sensor system(s) 606 may be configured to determine a surface normal vector for each point captured and/or sensed by a respective lidar sensor 114. As a non-limiting example, such a surface normal determination may be performed by calculating the normal of the cross product of vectors indicating directions from the point to two of the point's nearest neighboring points. As may be understood in the context of this disclosure, the sensor system(s) 606 may transmit any such lidar sensor data 114A to the perception system 622 and/or other systems of the vehicle computing device 604 for subsequent processing.

In some examples, the sensor system(s) 606 may provide visible light data 112A, lidar sensor data 114A, and/or other sensor data to the vehicle computing device 604 for combining, fusing, segmenting, classifying, labeling, synthesizing, and/or otherwise processing the data. In some examples, the memory 618 of the vehicle computing device 604 may also store simulated data that has been generated by a computer simulation algorithm, for use in part in testing. In some examples, the simulated data may include any type of simulated data, such as image data, sensor data (e.g., lidar data, RADAR data, and/or SONAR data), GPS data, etc. In some examples, the computer system(s) 602 may be configured to modify, transform, and/or perform converting operations on the simulated data for verifying an operation and/or for training models executable by machine learning systems.

In at least one example, the sensor system(s) 606 can include lidar sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras and/or other image capture devices (e.g., RGB, IR, intensity, depth, etc.), microphones, wheel encoders, environment sensors (e.g., temperature sensors, humidity sensors, light sensors, pressure sensors, etc.), etc. The sensor system(s) 606 can include multiple instances of each of these or other types of sensors. For instance, the lidar sensors can include individual lidar sensors located at the corners, front, back, sides, and/or top of the vehicle 110. As another example, cameras and/or other image capture devices can include multiple cameras disposed at various locations about the exterior and/or interior of the vehicle 110.

The sensor system(s) 606 can provide signals to the vehicle computing device 604. For example, each of the sensors included in the sensor system(s) 606 may be configured to send respective signals to the vehicle computing device 604, and such signals may include data indicating groups of objects detected by the respective sensor. In some examples, an image capture device, such as a camera, of the sensor system(s) 606 may provide a first signal to the vehicle computing device 604, and the first signal may include image data, such as visible light data 112A, indicating a first group of objects detectable in the environment 108 in which the image capture device is present. Additionally, lidar sensor 114 of the sensor system(s) 606 may provide a second signal to the vehicle computing device 604, and the second signal may include lidar sensor data 114A indicating a second group of objects detectable in the environment 108. Further, a radar sensor or one or more additional sensors of the sensor system(s) 606 may provide a third signal to the vehicle computing device 604, and the third signal may include sensor data indicating a third group of objects detectable in the environment 108. In such examples, the perception system 622 (e.g., the object detection system 630) may identify and/or determine a group of objects present in the environment 108 based at least in part on one or more of the signals received from the sensor system(s) 606. For example, the perception system 622 (e.g., the object detection system 630) may identify at least one object present in the environment 108 based at least in part on the one or more of the signals received from the sensor system(s) 606. The perception system 622 may also identify and/or otherwise determine an error associated with data included in one or more of the respective sensor signals (e.g., determine whether the identified object is absent from or misclassified in one or more of the groups of objects associated with the received signals).

The vehicle 110 can also include one or more emitters 608 for emitting light and/or sound, as described above. The emitters 608 in this example include interior audio and visual emitters to communicate with passengers of the vehicle 110. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles.

The vehicle 110 can also include one or more communication connection(s) 610 that enable communication between the vehicle 110 and one or more other local or remote computing device(s). For instance, the communication connection(s) 610 can facilitate communication with other local computing device(s) on the vehicle 110 and/or the drive system(s) 614. Also, the communication connection(s) 610 can allow the vehicle 110 to communicate with other nearby computing device(s) (e.g., other nearby vehicles, traffic signals, etc.). The communications connection(s) 610 also enable the vehicle 110 to communicate with a remote teleoperations computing device, a remote service center, or other remote services.

The communications connection(s) 610 can include physical and/or logical interfaces for connecting the vehicle computing device 604 to another computing device or a network, such as network(s) 632. For example, the communications connection(s) 610 can enable Wi-Fi-based communication such as via frequencies defined by the IEEE 802.11 standards, short range wireless frequencies such as Bluetooth, or any suitable wired or wireless communications protocol that enables the respective computing device to interface with the other computing device(s).

In at least one example, the vehicle 110 can include one or more drive systems 614. In some examples, the vehicle 110 can have a single drive system 614. In at least one example, if the vehicle 110 has multiple drive systems 614, individual drive systems 614 can be positioned on opposite ends of the vehicle 110 (e.g., the front and the rear, etc.). In at least one example, the drive system(s) 614 can include one or more sensor systems to detect conditions of the drive system(s) 614 and/or the surroundings of the vehicle 110. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other light sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) on the drive system(s) 614 can overlap or supplement corresponding systems of the vehicle 110 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) and to control operation of the various vehicle systems. In some examples, the drive system controller can include one or more processors and memory communicatively coupled with the one or more processors. The memory can store one or more systems to perform various functionalities of the drive system(s) 614. Furthermore, the drive system(s) 614 also include one or more communication connection(s) that enable communication by the respective drive system with one or more other local or remote computing device(s).

As described above, the vehicle 110 can send signals and/or sensor data to one or more remote computing device(s) 634, via the network(s) 632. In some examples, the vehicle 110 can send raw sensor data to the remote computing device(s) 634. In other examples, the vehicle 110 can send processed sensor data and/or representations of sensor data to the remote computing device(s) 634. In some examples, the vehicle 110 can send sensor data to the remote computing device(s) 634 at a particular frequency, after a lapse of a predetermined period of time, in near real-time, etc.

The remote computing device(s) 634 can receive the signals and/or sensor data (raw or processed) and can perform any of the processes described herein based at least in part on the signals and/or sensor data. In at least one example, the remote computing device(s) 634 can include one or more processors 636 and memory 638 communicatively coupled with the one or more processors 636. In the illustrated example, the memory 618 of the vehicle computing device 604 and the memory 638 of the remote computing device(s) 634 stores sensor data processing component 628. The memory 638 of the remote computing device(s) 634 additionally stores a machine learning model 640.

The sensor data (e.g., visible light sensor data 112A and/or lidar sensor data 114A) can represent sensor data collected by one or more onboard sensor systems (e.g., such as onboard sensor system(s) 606), or other sensor system(s), at previous time(s) (e.g., previously connected sensor data). In some examples, the sensor data can be stored in association with locations, object types, and/or other types of characteristics. Additionally, in at least one example, the behaviors of individual objects can be associated with particular sensor data from which the behaviors were determined.

In at least one example, the sensor data processing component 628 can receive sensor data (raw or processed) from one or more vehicles, such as the vehicle 110. As described above, the vehicle 110 can send signals including sensor data to the remote computing device(s) 634 at a particular frequency, after a lapse of a predetermined period of time, in near real-time, etc. Accordingly, the sensor data processing component 628 can receive the sensor data at a particular frequency, after a lapse of a predetermined period of time, in near real-time, etc. In additional and/or alternative examples, the sensor data processing component 628 can receive data from additional and/or alternative sensor system(s) (e.g., that are not associated with a vehicle).

In at least one example, the sensor data processing component 628 can process the sensor data. In some examples, the sensor data processing component 628 can determine a behavior of an object associated with a particular object type based on the sensor data. That is, the sensor data processing component 628 can analyze sensor data associated with a particular period of time to determine how objects(s) present in an environment behave during the period of time. In at least one example, data indicative of a behavior of an object associated with an object type, as determined from sensor data, can be associated with an observation.

In some examples the sensor data processing component 628 can associate visible light data 112A and/or lidar sensor data 114A with other image data or depth data. For example, the visible light data 112A and the lidar sensor data 114A may be associated with a first resolution that is lower than a second resolution of other image data (e.g., captured by other, higher resolution cameras of the vehicle 110). In some cases, the component 628 can include a machine learned model (or a depth completion algorithm) to generate relative depth data. For example, the visible light data 112A and/or the lidar sensor data 114A can be associated with higher resolution image data and the lidar sensor data 114A can be used to generate additional depth data for portions of the higher resolution image data not associated with a measured depth data. Examples of using lidar data to determine relative depth data are discussed in U.S. Pat. No. 10,984,543 entitled "Image-Based Depth Data and Relative Depth Data," and examples of using lidar data and a depth completion algorithm to determine higher density depth data are discussed in U.S. patent application Ser. No. 17/478,602 entitled "Associating Image Data and Depth Data for Depth Determination," the entire contents of both of which are hereby incorporated by reference for all purposes in their entirety.

In some examples, the perception system 622 of the memory 638 stores an object detection system 630. The object detection system 630 may identify and/or determine a one or more objects present in the environment 108 based at least in part on one or more of the signals received from the sensor system(s) 606. For example, the object detection system 630 may identify at least one object present in the environment 108 based at least in part on the one or more of the signals received from the sensor system(s) 606. The object detection system 630 may also detect and/or otherwise determine a particular location of each respective identified object within the environment 108 at a corresponding time. For example, the object detection system 630 may determine a particular location of the one or more objects in the environment 108, as well as a particular time at which the one or more object(s) is/was disposed at the location. Such a location may comprise coordinates (e.g., Cartesian, polar, GPS, etc.) identifying the position of the object(s). In some examples, the sensor data may be determined by the light sensor 118 (e.g., visible light and lidar sensors) at a first time. Additionally, the lidar sensor data 114A indicating the one or more objects may be determined by the lidar sensor 114 simultaneously with the visible light sensor 112 (e.g., at the first time). In such examples, the object detection system 630 may identify the object(s) and may determine a particular location of the object corresponding to the first time.

In the illustrated example, the memory 638 of the computing device(s) 634 stores a training component (not shown) and a machine-learning model component 640. In at least one instance, the machine-learning model component 640, after training, can be similar to the machine-learned model component 640. Though depicted as residing in the memory 638 for illustrative purposes, it is contemplated that the training component and the machine-learning model component 640 can additionally, or alternatively, be accessible to the vehicle computing device(s) 604 (e.g., stored in a different component of computing device(s) 604 and/or be accessible to the computing device(s) 634 (e.g., stored remotely).

In the memory 638, training component can train the machine-learning model component 640 to generate, for example, relative depth data based on lidar data captured using the sensor discussed herein. The training component can determine training data as inputs to the machine-learning model component 640. For example, the training data can include sensor data such as training image data captured by a vehicle. In some instances, the image data can be modified image data and/or synthetic image data. Additionally, the training data can include sensor data such as lidar data and/or bounding box data (e.g., two-dimensional bounding box data and/or three-dimensional bounding box data) as ground truth data.

The machine-learning model component 640 can use the training data provided by the training component to determine depth data associated with the training image data. In some instances, the machine-learning model component 640 can be trained to generate three-dimensional bounding boxes as well as relative depth data. Once the machine-learning model component 640 is trained, the machine-learning model component 640 can be deployed in the vehicle 110 as the machine-learned model component 640.

As noted above, the localization system 620, the perception system 622 and/or other components of the vehicle computing device 604 may be configured to detect and classify external objects, such as, for example, pedestrians, bicyclists, dogs, other vehicles, etc. Based at least in part on the classifications of the external objects, the external objects may be labeled as dynamic objects or static objects. For example, the perception system 622 may be configured to label a tree as a static object and may be configured to label a pedestrian as a dynamic object. Further data about external objects may be generated by tracking the external objects, and the object classification type may be used, in some examples, to predict or determine the likelihood that an external object may interfere with the vehicle 110 as it travels along a planned path. For example, an external object that is classified as a pedestrian may be associated with a maximum speed and/or an average speed. The localization system 620, the perception system 622, the sensor data processing component 628, and/or other components of the remote computing devices 634 may use the machine learning system 640, which may execute any one or more machine learning algorithms, such as, for example, neural networks, to perform classification operations.

A neural network utilized by the machine learning system 640 may comprise an algorithm that passes input data through a series of connected layers to produce an output. One example of a neural network is the convolutional neural network (CNN). Each layer in a CNN may also include another CNN or may include any number of layers. A neural network may utilize machine learning, which is a broad class of such algorithms in which an output is generated based on learned parameters. Although discussed in the context of neural networks, any type of machine learning may be used consistent with this disclosure.

The processor(s) 616 of the vehicle 110 and the processor(s) 636 of the remote computing device(s) 634 can be any suitable processor capable of executing instructions to process data and perform operations as described herein. By way of example and not limitation, the processor(s) 616 and 636 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and memory 638 are examples of non-transitory computer-readable media. Memory 618 and memory 638 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 110 can be associated with the remote computing device(s) 634 and/or components of the remote computing device(s) 634 can be associated with the vehicle 110. That is, the vehicle 110 can perform one or more of the functions associated with the remote computing device(s) 634, and vice versa.

Figure 7:
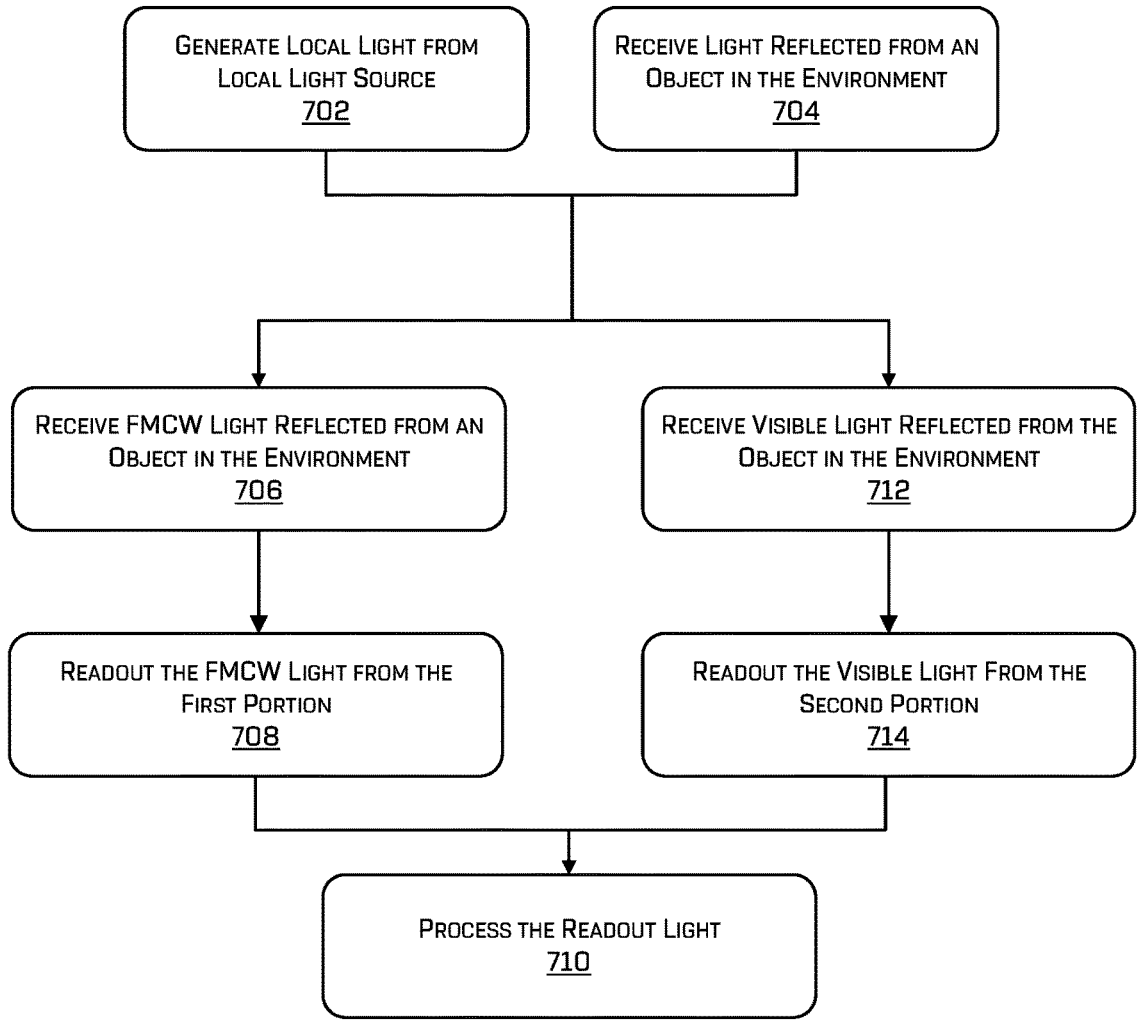
FIG. 7 illustrates an example process for capturing image data and lidar data.

FIG. 7 illustrates an example process for detecting image and lidar data. The process 700 is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the process.

In operation 702, light is generated from local light source, such as light source 206, of an imaging system, such as a time-of-flight (ToF) or 2D depth measurement system. In some examples, the imaging system is the imaging system 202. The light source 206 may include, for example, a laser which emits light having a particular operating wavelength in the infrared, visible, or ultraviolet portions of the electromagnetic spectrum. As an example, light source 206 may include a laser with one or more operating wavelengths between approximately 900 nanometers (nm) and 2000 nm and/or may generate FMCW light. In one example, the light is directed toward objects in the environment 108.

Light from the light source 206 directed toward an object 204 in the environment 108 is reflected back, in some instances, toward the imaging system 202 at operation 704. In one example, operation 704 may be performed simultaneously with operation 702. Natural light or visible light, which may include ambient light (e.g., sunlight) or light produced by other sources (e.g., streetlights or vehicle headlights), may also be reflected from an object 204 in the environment 108 back toward the imaging system 202. In one example, a light sensor, such as light sensor 118, receives the reflected light. The light sensor 118 may include a first photodetector (or portion, pixel, or element) that is configured to receive light reflected from the object 204 in the environment 108 and light from the light source 206. The light sensor 118 may also include a second photodetector (or portion, pixel, or element) that is configured to receive visible light reflected from the object 204. As explained above, the first and second photodetectors, in one example, are formed as a same sensor package (e.g., formed as a monolithic sensor or bonded together so that image and depth sensing elements are co-located).

Light that is reflected back from an object 204 in the environment 108 is received by the light sensor 118 at operation 706. As explained above, the first photodetector of the light sensor 118 may receive or detect the reflected light in the form of photons and produce one or more representative signals. In one example, the photodetectors 302 may be configured to detect the frequency of the local oscillator signal 222 and the reflected light, which may have a wavelength of 1400-1600 nm. The photodetector 304 may also produce, in one example, one or more respective photocurrent signals corresponding to the coherent mixing of the local oscillator signal 222 and the reflected light. Once captured, the lidar readout circuitry 402 reads out data from the first photodetector at operation 708, and the readout data is transferred to a controller or processing circuitry for processing, etc. at operation 710.

Light that is reflected back from an object 204 in the environment 108 is received by the light sensor 118 at operation 712. The second photodetector of the light sensor 118 may also receive or detect the reflected light in the form of photons and produce one or more representative signals. The photodetectors 306 may be configured to detect visible light that is emitted, scattered, or reflected by objects located in the environment 108. The visible light may include ambient light (e.g., sunlight) or light produced by other sources (e.g., streetlights or vehicle headlights). In some examples, one or more of the photodetectors 306 may include optical filters so that the photodetector 306 detects a particular wavelength range or color of visible light (e.g., red, blue, or green light). Once captured, the visible light readout circuitry 404 reads out data from the second photodetector at operation 714, and the readout data is transferred to a controller or processing circuitry for processing, etc. at operation 710.

EXAMPLE CLAUSES

A: A system comprising: a local light source configured to generate frequency modulated continuous wave (FMCW) light: a first pixel configured to receive first light reflected from an object in an environment and second light from the local light source, wherein the first light and the second light are based at least in part on the FMCW light: a second pixel configured to receive visible light reflected from the object: a first readout circuit configured to read first data from the first pixel; and a second readout circuit configured to read second data from the second pixel: wherein the first pixel is co-located with the second pixel; and wherein a depth value associated with the object is based at least in part on a frequency difference between the first light and the second light.

B: The system of paragraph A, wherein the first pixel and the second pixel are portions of a monolithic image sensor, wherein the first pixel comprises a region formed with germanium and the second pixel comprises a region formed with silicon.

C: The system of paragraph A or B, further comprising a color filter array associated with the second pixel.

D: The system of any of paragraphs A-C, further comprising a lens arrangement comprising at least seven spheric elements, wherein the first light and the visible light is directed through the lens arrangement to the first pixel and the second pixel.

E: The system of any of paragraphs A-D, wherein the local light source comprises a frequency of approximately 1550 nm.

F: The system of any of paragraphs A-E, further comprising: a perception system configured to: receive a first output from the first readout circuit: receive a second output from the second readout circuit; and detect, based at least in part on the first output and the second output, an object in an environment; and a controller configured to control a vehicle in the environment based at least in part on detecting the object.

G: A light sensor comprising: a lens arrangement receiving light signals reflected from a target, the lens arrangement comprising: at least seven spheric elements: an image circle of at least 12 millimeters; and an effective focal length of at least 8 millimeters; and an optical array receiving the light signals via the lens arrangement, the optical array including: an array of first photodetector elements detecting frequency modulated continuous wave (FMCW) signals from the light signals, and second photodetector elements in the array of first photodetector elements detecting visible light signals from the light signals.

H: The light sensor of paragraph G, further comprising a local light source outputting a light, wherein a first portion of the light is output toward the target and wherein a second portion of the light is directed to the first photodetector elements.

I: The light sensor of paragraph H, further comprising one or more processors configured to: determine, based at least in part on the second portion of the light and the FMCW signals from the light signals, a frequency difference; and determine, based at least in part on the frequency difference, a depth value.

J: The light sensor of any of paragraphs G-I, wherein the optical array is a monolithic optical array.

K. The light sensor of any of paragraphs G-J, wherein the lens arrangement comprises an aperture of F/5.45.

L. The light sensor of any of paragraphs G-K, wherein a first region of the array of first photodetector elements is formed with germanium and a second region of the second photodetector elements is formed with silicon.

M: The light sensor of any of paragraphs G-L, wherein the array of first photodetector elements and the second photodetector elements in the array of first photodetector elements are co-located in a same sensor package.

N: A method comprising: receiving, at a lens arrangement comprising at least seven spherical elements, light signals reflected from a target: receiving, at an optical array and via the lens arrangement, the light signals, the optical array including first photodetector elements and second photodetector elements: detecting, by the first photodetector elements, frequency modulated continuous wave (FMCW) signals from the light signals; and detecting, by the second photodetector elements, visible light signals from the light signals.

O: The method of paragraph N, wherein the FMCW signals are first FMCW signals, the method further comprising outputting second FMCW signals, wherein: a first portion of the second FMCW signals is output toward the target: a second portion of the second FMCW signals is directed to the first photodetector elements; and the first FMCW signal are based on the second FMCW signals.

P: The method of paragraph O, further comprising: determining, based at least in part on the second portion of the second FMCW signals and the FMCW signals, a frequency difference; and determining, based at least in part on the frequency difference, a depth value.

Q: The method of any of paragraphs N-P, wherein the lens arrangement comprises: an image circle of at least 12 millimeters; and an effective focal length of at least 8 millimeters.

R: The method of any of paragraphs N-Q, wherein the lens arrangement comprises an aperture of F/5.45.

S: The method of any of paragraphs N-R, further comprising: outputting a first output by the first photodetector elements: outputting a second output by the second photodetector elements; and determining, based at least in part on the first output and the second output, an object in an environment; and controlling a vehicle in the environment based at least in part on the object.

T: The method of any of paragraphs N-S, further comprising: capturing first sensor data using the optical array, wherein the first sensor data is associated with a first resolution: receiving second sensor data from a light sensor, wherein the second sensor data is associated with a second resolution that is greater than the first resolution; and associating the first sensor data and the second sensor data.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A light sensor comprising:
   a light source outputting first light signals;
   a lens arrangement receiving second light signals reflected from a target based on the first light signals, the lens arrangement comprising:
      at least seven spheric elements;
      an image circle of at least 12 millimeters; and
      an effective focal length of at least 8 millimeters; and
   an optical array receiving the second light signals via the lens arrangement, the optical array including:
      an array of lidar sensing photodetector elements detecting frequency modulated continuous wave (FMCW) signals from the second light signals, and
      visible light sensing photodetector elements in the array of lidar sensing photodetector elements detecting visible light signals from the second light signals.

2. The light sensor of claim 1, wherein the first light signals are output toward the target and wherein the second light signals are directed to the lidar sensing photodetector elements.

3. The light sensor of claim 2, further comprising one or more processors configured to:
   determine, based at least in part on the second light signals and the FMCW signals, a frequency difference; and
   determine, based at least in part on the frequency difference, a depth value.

4. The light sensor of claim 1, wherein the optical array is a monolithic optical array.

5. The light sensor of claim 1, wherein the lens arrangement comprises an aperture of F/5.45.

6. The light sensor of claim 1, wherein a first region of the array of lidar sensing photodetector elements is formed with germanium and a second region of the visible light sensing photodetector elements is formed with silicon.

7. The light sensor of claim 1, wherein the array of lidar sensing photodetector elements and the light sensing photodetector elements in the array of lidar sensing photodetector elements are co-located in a same sensor package.

8. A method comprising:
   emitting first light signals towards a target;
   receiving, at a lens arrangement comprising at least seven spherical elements, second light signals reflected from the target based on the first light signals;
   receiving, at an optical array and via the lens arrangement, the second light signals, the optical array including lidar sensing photodetector elements and visible light sensing photodetector elements;
   detecting, by the lidar sensing photodetector elements, frequency modulated continuous wave (FMCW) signals from the second light signals; and
   detecting, by the visible light sensing photodetector elements, visible light signals from the second light signals.

9. The method of claim 8, wherein the FMCW signals are first FMCW signals, the method further comprising outputting second FMCW signals, wherein:
   a first portion of the second FMCW signals is output toward the target;
   a second portion of the second FMCW signals is directed to the lidar sensing first photodetector elements; and
   the first FMCW signal are based on the second FMCW signals.

10. The method of claim 9, further comprising:
    determining, based at least in part on the second portion of the second FMCW signals and the FMCW signals, a frequency difference; and
    determining, based at least in part on the frequency difference, a depth value.

11. The method of claim 8, wherein the lens arrangement comprises:
    an image circle of at least 12 millimeters; and
    an effective focal length of at least 8 millimeters.

12. The method of claim 11, wherein the lens arrangement comprises an aperture of F/5.45.

13. The method of claim 8, further comprising:
    outputting a first output by the lidar sensing photodetector elements;
    outputting a second output by the visible light sensing photodetector elements; and
    determining, based at least in part on the first output and the second output, an object in an environment; and
    controlling a vehicle in the environment based at least in part on the object.

14. The method of claim 8, further comprising:
    capturing first sensor data using the optical array, wherein the first sensor data is associated with a first resolution;
    receiving second sensor data from a light sensor, wherein the second sensor data is associated with a second resolution that is greater than the first resolution; and
    associating the first sensor data and the second sensor data.

\* \* \* \* \*